United States Patent [19]

Satō et al.

[11] Patent Number: 4,551,375
[45] Date of Patent: Nov. 5, 1985

[54] GLASS CLOTH WITH THIN REINFORCED JOINTS

[75] Inventors: Masanori Satō; Kazuo Iizima, both of Fukushima, Japan

[73] Assignee: Nitto Boseki Co., Ltd., Japan

[21] Appl. No.: 650,531

[22] Filed: Sep. 14, 1984

[30] Foreign Application Priority Data

Sep. 22, 1983 [JP] Japan .................... 58-146051[U]

[51] Int. Cl.$^4$ ................................ B32B 3/00
[52] U.S. Cl. ................................ 428/57; 428/220
[58] Field of Search ................... 428/57, 220

[56] References Cited

U.S. PATENT DOCUMENTS 3,664,907  5/1972  Price ........................ 428/57

Primary Examiner—Marion E. McCamish
Attorney, Agent, or Firm—Murray, Whisenhunt and Ferguson

[57] ABSTRACT

A continuous glass cloth comprising a plurality of glass cloth pieces which are joined together has joints between adjacent glass cloth pieces which are of greatly reduced thickness as compared to conventional glass cloths. The joints comprise end portions of the glass cloth pieces which are to be joined together, overlapping by at least one joining member, with a thermoplastic resin located between the joining member and the end portions of the glass cloth pieces. The thermoplastic resin bonds the joining member to the end portions, without the necessity for the end portions to overlap one another.

9 Claims, 6 Drawing Figures

GLASS CLOTH WITH THIN REINFORCED JOINTS

FIELD OF THE INVENTION

The present invention relates to a glass cloth with thin joints. More particularly, it relates to a continuous glass cloth formed from a plurality of glass cloth pieces wherein the joints between the glass cloth pieces are reduced in thickness. The reduced thickness joints render the glass cloth particularly suitable for utilization in the formation of pre-pregs.

BACKGROUND OF THE INVENTION

Glass cloth has been used as an insulative reinforcing material. Generally, the glass cloth is impregnated with a varnish, dried to form a pre-preg, and this pre-preg is then molded to produce a laminated material.

These pre-pregs are usually produced according to a process as illustrated in the flow diagram of FIG. 1. A glass cloth 2 from a roll 1 is introduced into a varnish bath 3, where it is impregnated with a varnish; passed between coaters 4—4, disposed at a set distance apart to remove excess varnish; dried in a drying unit 5; and wound as a pre-preg on roll 6. In order to increase the efficiency of the production of pre-pregs, there has been an increasing trend toward "large packaging" of the roll 1, i.e., the use of a plurality of glass cloth pieces joined together to form a larger continuous glass cloth. Thus, the glass cloth wound on the roll 1 inevitably contains joints or connected portions.

Conventional glass cloth joints are illustrated in FIGS. 2 and 3. In the embodiment of FIG. 2, end portions of the glass cloths 2—2 to be joined together are superposed on each other with a thermoplastic film 7 sandwiched therebetween, and then are joined together by heat-pressing. Alternatively, as shown in FIG. 3, end portions of the glass cloths 2—2 to be joined together are superposed and sewn together with stitching 8. In these joints, however, the thickness of the joint is two or more times the thickness of the glass cloth. This gives rise to some problems in the production of pre-pregs. For example, when these joints pass through the clearance between the coaters 4—4 of FIG. 1, the joint will become caught between the coaters 4—4, unless the clearance is increased, resulting in the tearing of the glass cloth. This problem can be overcome by the provision of an additional mechanism for the opening of the coaters 4—4 when the joint passes therethrough. This, however, requires the provision of more complex equipment. Moreover, if the coaters 4—4 are opened, an excess of varnish attached to that part of the glass cloth which has passed through the clearance while the coaters are opened, and the resulting "sagging" of the varnish causes problems such as attachment of the varnish to guide rollers.

SUMMARY OF THE INVENTION

The present invention is intended to overcome the aforementioned defects of conventional joints, and the object of the present invention is to provide a glass cloth with joints which are reduced in thickness as compared with the conventional glass cloth joints and do not cause any problem in the production of pre-pregs.

The present invention relates to a continuous glass cloth for use in the formation of pre-pregs by impregnating said continuous glass cloth with a thermosetting resin varnish and heating the so-impregnated continuous glass cloth to dry the varnish comprising a plurality of glass cloth pieces of predetermined thickness, having edges and end portions associated with adjacent respective edges, which are joined together, the improvement comprising:

joints connecting adjacent glass cloth pieces together at respective adjacent edges thereof, said joints comprising:

end portions of respective adjacent glass cloth pieces, said end portions being disposed in a substantially coplanar relationship with one another and having respective associated edges thereof in substantially abutting relationship with each other;

at least one joining member overlapping said end portions of said adjacent glass cloth pieces, said joining member inert to and insoluble in said thermosetting resin varnish during pre-preg formation and being capable of withstanding the drying temperature of said varnish without substantial loss of bending, tensile and impact strength; and a thermoplastic resin located between said at least one joining member and said end portions of said adjacent glass cloth pieces, said thermoplastic resin bonding said at least one joining member to said end portions, said thermoplastic resin being inert to and insoluble in said thermosetting resin varnish during pre-preg formation and capable of withstanding the drying temperature of said varnish without substantial loss of bonding strength.

DETAILED DESCRIPTION OF THE INVENTION

The present invention will hereinafter be explained with reference to FIGS. 4 to 6.

Figure 4:
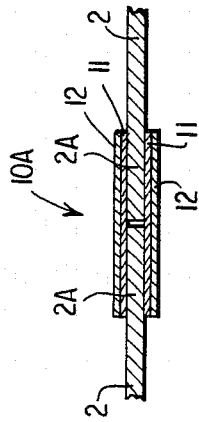
FIG. 4 is a cross-sectional view of a joint according to one embodiment of the present invention.

Referring to FIG. 4, there is shown a cross-sectional view of a joint 10A according to one embodiment of the present invention. The joint 10A comprises end portions 2A—2A of glass cloths 2—2, which are to be joined together, said end portions being disposed in a substantially coplanar relationship with one another, i.e., they do not overlap, and the respective edges of the end portions 2A—2A are in substantially abutting relationships with one another. Thermoplastic resin films 11—11 are located on both the top and bottom surfaces of the end portions, and joining members 12—12, which are thinner than the glass cloths 2—2, are provided on the thermoplastic resin films 11—11 and overlap the end portions 2A—2A. The joining members 12—12 are bonded to the glass cloths 2—2 by the thermoplastic resin films 11—11 upon heat-pressing of the assembly.

Figure 5:
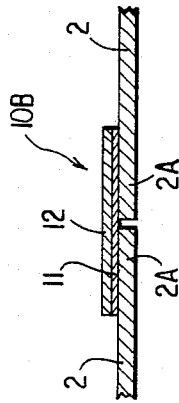
FIG. 5 is a cross-sectional view of a joint according to another embodiment of the present invention.

Another embodiment of the joint of the present invention is shown in FIG. 5. In this embodiment, the joint 10B comprises end portions 2A—2A of glass cloths 2—2, which are to be joined together, said end portions being disposed in a substantially coplanar relationship with one another, i.e., they do not overlap, and the respective edges of the end portions 2A—2A are in substantially abutting relationship with one another. A thermoplastic film 11 is located on one side of the end portions 2A—2A and a joining member 12 is provided on the thermoplastic resin film 11 and overlaps the end portions 2A—2A. The joining member 12 is bonded to the glass cloths 2—2 by the thermosplastic resin film 11 upon heat-pressing of the assembly.

Figure 6:
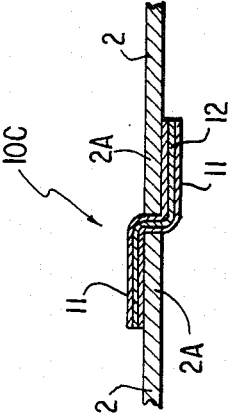
FIG. 6 is a cross-sectional view of a joint according to still another embodiment of the present invention.

Still another embodiment of the joint of the present invention is shown in FIG. 6. In this embodiment, the joint 10C comprises end portions 2A—2A of glass cloths 2—2, which are to be joined together, said end portions being disposed in a substantially coplanar relationship with one another and the respective edges of the end portions 2A—2A are in substantially abutting relationship. A joining member 12 overlaps the left-hand end portion 2A on its top surface and the right-hand end portion 2A on its bottom surface. Both the top and bottom surfaces of the joining member 12 have a thermoplastic resin film 11—11 thereon. The joining member 12 is bonded to the top surface of the left-hand end portion and the bottom surface of the right-hand end portion by the thermoplastic resin film 11—11 upon heat-pressing of the assembly.

In each of the embodiments, the end portions 2A—2A of the glass cloths 2—2, which are to be joined, do not overlap, but rather are disposed in a substantially coplanar relationship with one another, whereby the thickness of the joint is not unduly increased. The end portions 2A—2A are connected by means of the thin joining member 12, the joining member 12 and the glass cloths 2—2 being bonded together by means of the thermoplastic resin layer(s). The joining member 12 is an important feature of the present invention and is required to be stable against (inert to and insoluble in) the thermosetting resin varnish used in the production of pre-pregs and durable under the drying temperatures (typically, from about 150° to 200° C.) utilized in the production of pre-pregs so that the bending, tensile and impact strength of the joining member 12 will be sufficient to withstand the mechanical bending and tensile and impact forces exerted on the joint during the production of pre-pregs. Typical examples of materials which can be used as the joining member 12, having such physical properties, include fabrics or scrims made of glass fibers, chemical fibers (e.g., polyester fiber or rayon fiber), cotton and the like. Of course, any material with the requisite stability and physical properties can be utilized, preferably, glass fiber materials are utilized. In order to effectively reduce the total thickness of the joint, it is necessary that the joining member 12 be thinner than the glass cloth 2 which is being joined. Usually, it is suitable that the thickness of the joining member 12 be from 20 to 100 microns.

As the thermoplastic resin film 11, resins having a melting point of more than 150° C. and stable against the thermosetting resin varnish are utilized e.g., polyethylene terephthalate, polybutylene terephthalate and nylon can be used. Resins having a melting point of less than 150 ° C. cannot resist the drying temperatures generally used in the production pre-pregs. Also, resins soluble in the thermosetting resin varnish used in the production of pre-pregs cannot maintain their bonding strength during processing. Preferably, the thickness of the thermoplastic resin film is from 4 to 50 microns. If the thickness is too small, the bonding strength is reduced; if the thickness is too large, the joint is excessively increased in thickness, thereby causing problems as encountered in the prior art.

A typical example of thermosetting resin varnishes used in the production of pre-pregs is a varnish consisting of 125 parts of a bisphenol A-type epoxy resin (epoxy equivalent: 500, epoxy value (bromium content, %): 0.20–0.22), 4.0 parts of dicyandiamide, 0.2 parts of benzyldimethylamine, 55 parts of acetone, 14.0 parts of dimethylformamide, and 3.0 parts of water. This varnish will be referred to hereinafter as "Varnish G-10".

Figure 1:
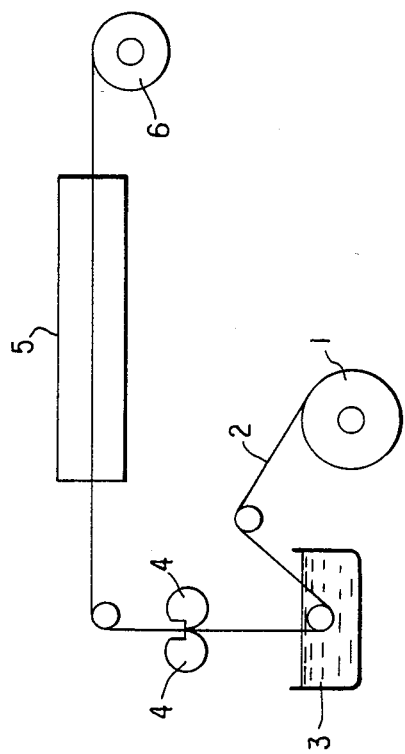
FIG. 1 is a schematic diagram illustrating a conventional process for the production of pre-pregs.
Figure 2:
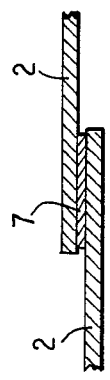
FIG. 2 is a cross-sectional view of a conventional joint.
Figure 3:
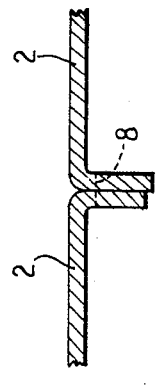
FIG. 3 is a cross-sectional view of another conventional joint.

The total thickness of the joints, e.g., each of the joints 10A, 10B and 10C, is adjusted to less than about 1.5 times that of the glass cloth. As long as the total thickness of the joint is less than about 1.5 times that of the glass cloth, it can pass through the coaters 4—4 (FIG. 1) without the necessity of opening the same during pre-preg formation.

In all of the above embodiments, a thermoplastic resin film is placed on the end portions of the glass cloths which are to be joined together and a joining member is placed in contact with the thermoplastic resin film, the joining member overlapping the end portions of the glass cloths, and the whole joint assembly is heat-pressed whereupon the glass cloths and the joining member are bonded together through the thermoplastic resin film. It is possible to join the glass cloths together solely by utilization of a thermoplastic resin film followed by heat-pressing. However, in this case, the thermoplastic resin film is easily broken, at the joint, by mechanical bending and impact forces and the like exerted during the production of pre-pregs. This problem cannot be overcome even if the thickness of the joint is increased. For this reason, in the present invention, at least one joining member, of sufficient strength, is utilized in combination with the thermoplastic resin film, and the thermoplastic resin film is used to bond the glass cloth to the joining member. Of couse, a thermoplastic resin powder can be used in placed of a thermoplastic resin film in assembling the joint for subsequent heat-pressing.

In accordance with the present invention, as described above, the end portions of the glass cloths, which are to be joined together, are disposed in such a manner that they do not overlap and are connected by means of at least one joining member with a thermoplastic resin sandwiched between the at least one joining member and the end portions of the glass cloths. Thus, the thickness of the joint can be greatly reduced, for example, to less than 1.5 times that of the glass cloth. Furthermore, the joining member and the thermoplastic resin have such physical properties as to produce a durable joint even under the conditions of pre-preg formation. Thus, the continuous glass cloth of the present invention can be utilized in the production of pre-preg in a trouble-free manner.

The present invention is described in greater detail with reference to the following example.

EXAMPLE

Two glass cloths 2—2, each of JISEPF 18 (as defined in JIS R3416, thickness: 0.18 mm, weight: 200 g/m$^2$—corresponding to #7628 Style commercially availabe in the United States) were disposed as shown in FIG. 4. Polyethylene terephthalate films (thickness: 15 microns) 11—11 were placed on the top and bottom surfaces of the end portions, also as shown in FIG. 4. Further, two thin glass fabrics (thickness: 25 microns) 12—12 were placed on the polyethylene terephthalate films, as shown in FIG. 4. Bonding was effected by heating at a temperature of 380° C. for 5 seconds.

The glass cloth with the above joint was impregnated with a surface treating agent, sent to a drying step where it was dried at 130° C., impregnated with Varnish G-10, passed through coaters with a clearance of 0.3 mm to remove excess varnish, and then heated at a drying temperature of 170° C. to produce a pre-preg. The joint was caught in the clearance between the coaters, and it was also not separated by heat. That is, the desired pre-preg could be produced without causing any problems.

While the invention has been described in detail and with reference to specific embodiments thereof, it will be apparent to one skilled in the art that various changes and modifications can be made therein without departing from the spirit and scope thereof.

What is claimed is:

1. In a continuous glass cloth for use in the formation of pre-pregs by impregnating said continuous glass cloth with a thermosetting resin varnish and heating the soimpregnated continuous glass cloth to dry the varnish comprising a plurality of glass cloth pieces of predetermined thickness, having edges and end portions associated with and adjacent respective edges, which are joined together, the improvement comprising:

joints connecting adjacent glass cloth pieces together at respective adjacent edges thereof, each said joint having a total thickness less than about 1.5 times the thickness of said glass cloth, said joints comprising:

end portions of respective adjacent glass cloth pieces, said end portions being disposed in a subtantially coplanar relationship with one another and having respective associated edges thereof in substantially abutting relationship with each other;

at least one joining member overlapping said end portions of said adjacent glass cloth pieces, said joining member inert to and insoluble in said thermosetting resin varnish during pre-preg formation and being capable of withstanding the drying temperature of said varnish without substantial loss of bending, tensile and impact strength; and a thermoplastic resin located between said at least one joining member and said end portions of said adjacent glass cloth pieces, said thermoplastic resin bonding said at least one joining member to said end portions, said thermoplastic resin being inert to and insoluble in said thermosetting resin varnish during pre-preg formation and capable of withstanding the drying temperature of said varnish without substantial loss of bonding strength.

2. The glass cloth as claimed in claim 1, wherein the thickness of said joining member is from 20 to 100 microns.

3. The glass cloth as claimed in claim 1, wherein the joining member is a glass fiber fabric.

4. The glass cloth as claimed in claim 3, wherein the thermoplastic resin is a thermoplastic resin film covering substantially the entire surface of the joining member which overlaps said end portions.

5. The glass cloth as claimed in claim 4, wherein the thickness of the thermoplastic resin film is from 4 to 50 microns.

6. The glass cloth as claimed in claim 1, wherein the thermoplastic resin is a thermoplastic resin film covering substantially the entire surface of the joining member which overlaps said end portions.

7. The glass cloth as claimed in claim 6, wherein the thickness of the thermoplastic resin film is from 4 to 50 microns.

8. The glass cloth as claimed in claim 1, wherein each said joint comprises a single joining member overlapping said end portions of the adjacent glass cloth pieces.

9. The glass cloth as claimed in claim 8, wherein said single joining member overlaps one of said end portions on one side of said plane and the other of said end portions on the other side of said plane.

* * * * *